United States Patent
Sato et al.

(10) Patent No.: US 12,379,558 B2
(45) Date of Patent: Aug. 5, 2025

(54) OPTICAL FIBER RIBBON AND SUB-TAPE-TYPE OPTICAL FIBER RIBBON

(71) Applicant: SUMITOMO ELECTRIC INDUSTRIES, LTD., Osaka (JP)

(72) Inventors: Toshihisa Sato, Osaka (JP); Takashi Fujii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 160 days.

(21) Appl. No.: 18/245,587

(22) PCT Filed: Sep. 13, 2021

(86) PCT No.: PCT/JP2021/033606
§ 371 (c)(1),
(2) Date: Mar. 16, 2023

(87) PCT Pub. No.: WO2022/059654
PCT Pub. Date: Mar. 24, 2022

(65) Prior Publication Data
US 2023/0367088 A1    Nov. 16, 2023

(30) Foreign Application Priority Data
Sep. 16, 2020   (JP) ................................. 2020-155584

(51) Int. Cl.
*G02B 6/44* (2006.01)
(52) U.S. Cl.
CPC .................................. *G02B 6/4403* (2013.01)
(58) Field of Classification Search
CPC .................................................. G02B 6/4403
(Continued)

(56) References Cited

U.S. PATENT DOCUMENTS

2005/0226573 A1   10/2005  Okuno et al.
2017/0090135 A1   3/2017   Sato et al.
(Continued)

FOREIGN PATENT DOCUMENTS

CN    111175887 A    5/2020
EP    4180850 A1     5/2023
(Continued)

OTHER PUBLICATIONS

International Search Report dated Nov. 16, 2021 issued in PCT/JP2021/033606.
(Continued)

*Primary Examiner* — Jerry M Blevins
(74) *Attorney, Agent, or Firm* — MCDONALD HOPKINS LLC

(57) ABSTRACT

An intermittently coupled-type optical fiber ribbon includes a plurality of optical fibers arranged in parallel and intermittently coupling portions formed by coupling parts between the adjacent optical fibers with a resin. In the coupling portions, the resin is provided on one side surface and the other side surface of the optical fiber ribbon. When an average of maximum values of thicknesses TF of the coupling portions on the one side surface is set as $TF_{ave}$ and an outer diameter of each optical fiber is set as D, $D/4 \leq TF_{ave} \leq D/2$. When an average of maximum values of thicknesses TB of the coupling portions on the other side surface is set as $TB_{ave}$, $TB_{ave} < TF_{ave}$.

6 Claims, 5 Drawing Sheets

(58) Field of Classification Search
USPC .......................................................... 385/114
See application file for complete search history.

(56) References Cited

U.S. PATENT DOCUMENTS

| | | | |
|---|---|---|---|
| 2018/0031792 A1* | 2/2018 | Risch | G02B 6/448 |
| 2019/0011656 A1* | 1/2019 | Sato | H01B 7/08 |
| 2020/0355882 A1 | 11/2020 | Takeuchi et al. | |

FOREIGN PATENT DOCUMENTS

| | | |
|---|---|---|
| JP | 4049154 B2 | 2/2008 |
| JP | 2016-133607 A | 7/2016 |
| JP | 2016-146003 A | 8/2016 |
| JP | 2017-062431 A | 3/2017 |
| JP | 2019-049617 A | 3/2019 |
| JP | 2019-523460 A | 8/2019 |
| WO | 2018-022031 A1 | 2/2018 |

OTHER PUBLICATIONS

Written Opinion dated Nov. 16, 2021 issued in PCT/JP2021/033606.

Japanese Office Action issued in Japanese Patent Application No. 2022-550556 dated Jun. 10, 2025.

KIT Mathematics Navigation, [online], Oct. 4, 2023, Kanazawa Institute of Technology, [acquired on Jun. 4, 2025], acquired from < https://w3e.kanazawa-it.ac.jp/math/category/sekibun/example/henkan-tex.cgi?target=/math/category/sekibun/example/int-sqrt(a%5E2-x%5E2).html >.

* cited by examiner

OPTICAL FIBER RIBBON AND SUB-TAPE-TYPE OPTICAL FIBER RIBBON

TECHNICAL FIELD

The present disclosure relates to an optical fiber ribbon and a sub-tape-type optical fiber ribbon.

The present application claims priority based on a Japanese Application No. 2020-155584 filed on Sep. 16, 2020, and incorporates all the contents described in the Japanese Application.

BACKGROUND ART

Patent Literature 1 describes an optical fiber ribbon including a configuration in which an adhesive member is intermittently applied to both an upper surface side and a lower surface side of adjacent optical fibers, and when a thickness of the adhesive member is set as T and a diameter of the optical fiber is set as D, $T<(\sqrt{3}-1)/2 \times D$ is satisfied.

Patent Literature 2 describes an optical fiber ribbon including a configuration in which a marking for identifying a number of the optical fiber ribbon is applied only to one side of a plurality of optical fibers arranged in parallel, and an adhesive resin is applied only to the other side.

Patent Literature 3 describes an optical fiber ribbon in which adjacent optical fibers are intermittently adhered to each other via a coupling portion, and breaking elongation of an adhesive resin constituting the coupling portion is set to be more than 250% and 500% or less.

Patent Literature 4 describes an optical fiber ribbon including a configuration in which two or more sub-ribbons are formed by intermittently adhering adjacent optical fibers with a first adhesive portion, the sub-ribbons are intermittently adhered and integrated by a second adhesive portion, a thickness of the first adhesive portion is set to a thickness that does not protrude from a tangent line passing through front surfaces of the optical fibers, and a thickness of the second adhesive portion is set to a thickness that protrudes from the above tangent line.

CITATION LIST

Patent Literature

Patent Literature 1: JP2016-133607A
Patent Literature 2: JP2019-49617A
Patent Literature 3: JP2017-62431A
Patent Literature 4: JP2016-146003A

SUMMARY OF INVENTION

An optical fiber ribbon according to an aspect of the present disclosure is an intermittently coupled-type optical fiber ribbon, including: a plurality of optical fibers arranged in parallel; and intermittently coupling portions formed by coupling parts between the adjacent optical fibers with a resin, in which in the coupling portions, the resin is provided on one side surface and the other side surface of the optical fiber ribbon, when an average of maximum values of thicknesses TF of the coupling portions on the one side surface is set as $TF_{ave}$ and an outer diameter of each optical fiber is set as D, $D/4 \leq TF_{ave} \leq D/2$, and when an average of maximum values of thicknesses TB of the coupling portions on the other side surface is set as $TB_{ave}$, $TB_{ave}<TF_{ave}$.

In addition, a sub-ribbon-type optical fiber ribbon according to an aspect of the present disclosure is a sub-ribbon-type optical fiber ribbon, including: at least two sub-ribbons each including a plurality of optical fibers arranged in parallel and a first coupling portion formed by coupling the adjacent optical fibers with a resin; and intermittently second coupling portions formed by coupling parts between the adjacent sub-ribbons with the resin, in which in the second coupling portions, the resin is provided on one side surface and the other side surface of the sub-ribbon-type optical fiber ribbon, when an average of maximum values of thicknesses TF1 of the second coupling portions on the one side surface is set as $TF1_{ave}$ and an outer diameter of each optical fiber is set as D, $D/4 \leq TF1_{ave} \leq D/2$, and when an average of maximum values of thicknesses TB1 of the second coupling portions on the other side surface is set as $TB1_{ave}$, $TB1_{ave}<TF1_{ave}$.

DESCRIPTION OF EMBODIMENTS

Technical Problem

Figure 1:
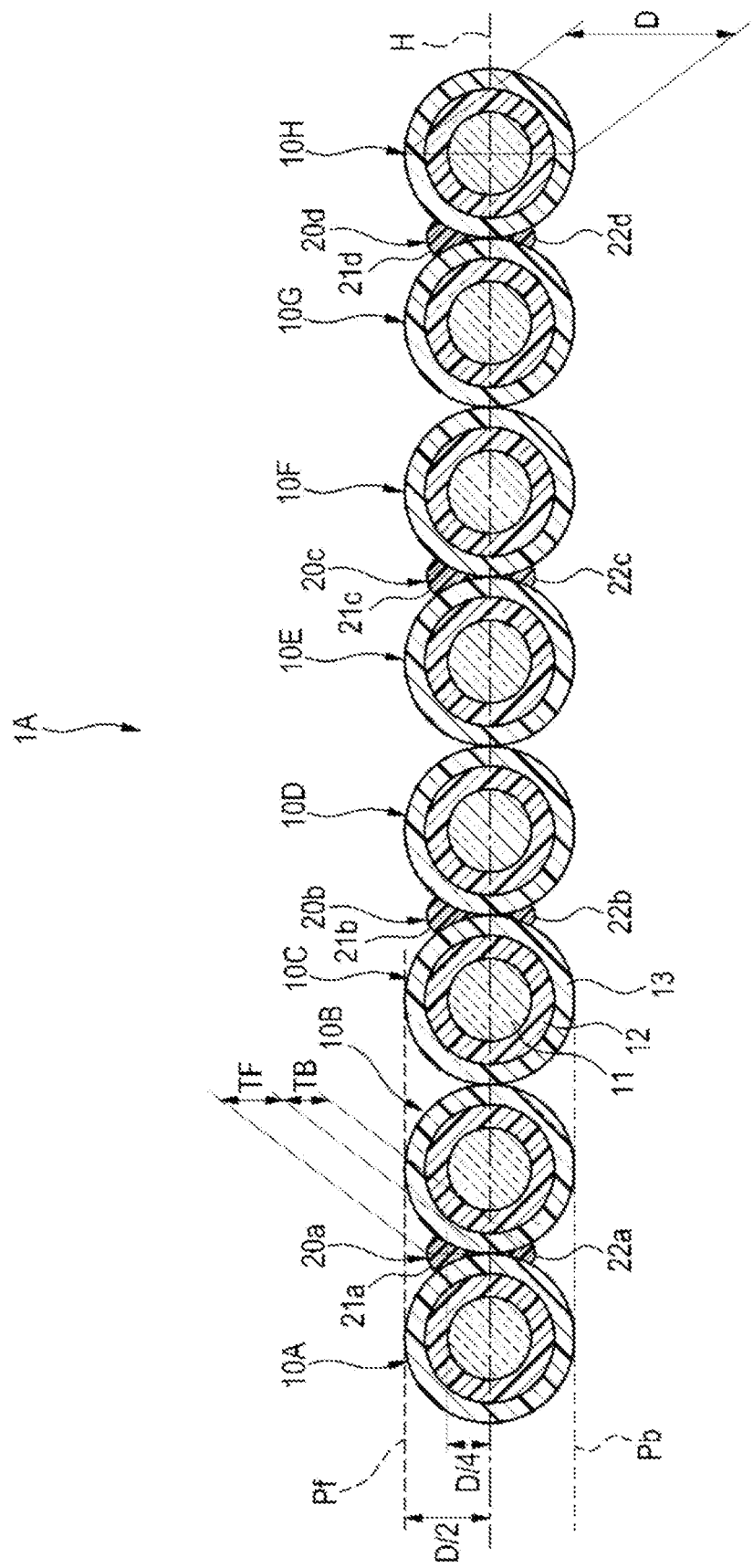
FIG. 1 is a cross-sectional view showing an optical fiber ribbon according to a first embodiment.

An optical fiber ribbon is sometimes used by being housed in an optical fiber cable. A force is applied so as to bend to roll the optical fiber ribbon up in a cross-sectional direction perpendicular to a longitudinal direction during being stored in the optical fiber cable. Therefore, when the optical fiber ribbon is rolled up, there is a possibility that an adhesive portion coupling the optical fibers is broken.

In the case of the optical fiber ribbon described in Patent Literature 1, since the same amount of adhesive member is applied on both the upper surface side and the lower surface side, there is a high possibility that breaking of the adhesive member or peeling between the adhesive member and the optical fibers occur on the bent outside, and the optical fiber ribbon disassembles.

In the case of the optical fiber ribbons described in Patent Literatures 2 and 3, since the adhesive resin is applied only on one side, there is a high possibility that when the optical fiber ribbon is bent, the adhesive resin is broken or peeling between the adhesive resin and the optical fibers occurs, and the optical fiber ribbon disassembles.

In the case of the optical fiber ribbon described in Patent Literature 4, since the second adhesive portion protrudes from the tangent line passing through the front surfaces of the optical fibers, a cross-sectional area of the optical fiber ribbon increases, and the optical fiber ribbon cannot be housed in the optical fiber cable at high density.

An object of the present disclosure is to provide an optical fiber ribbon and a sub-ribbon-type optical fiber ribbon that can prevent breaking of an adhesive resin coupling optical fibers and that can be housed in an optical fiber cable at high density.

Advantageous Effects of Invention

According to the present disclosure, an optical fiber ribbon and a sub-ribbon-type optical fiber ribbon that can prevent breaking of a resin coupling optical fibers and that can be housed in an optical fiber cable at high density can be provided.

DESCRIPTION OF EMBODIMENTS

First, embodiments of the present disclosure are listed and described. An optical fiber ribbon according to an aspect of the present disclosure is (1) an intermittently coupled-type optical fiber ribbon, including: a plurality of optical fibers arranged in parallel; and intermittently coupling portions formed by coupling parts between the adjacent optical fibers with a resin, in which in the coupling portions, the resin is provided on one side surface and the other side surface of the optical fiber ribbon, when an average of maximum values of thicknesses TF of the coupling portions on the one side surface is set as $TF_{ave}$ and an outer diameter of each optical fiber is set as D, $D/4 \leq TF_{ave} \leq D/2$, and when an average of maximum values of thicknesses TB of the coupling portions on the other side surface is set as $TB_{ave}$, $TB_{ave} < TF_{ave}$. According to this configuration, when a force is applied so as to bend to roll the optical fiber ribbon up in a cross-sectional direction perpendicular to a longitudinal direction during being stored in an optical fiber cable, since a resin amount on a first surface and a resin amount on a second surface are different, breaking of the resin or peeling between the resin and the optical fibers can be made less likely to occur. Therefore, a risk of the optical fiber ribbon disassembling is reduced, and the optical fiber ribbon can be easily rolled up and stored in the optical fiber cable. In addition, since the resin does not protrude from a tangent line passing through front surfaces of the optical fibers, a ribbon cross-sectional area can be prevented from becoming large, and the optical fiber ribbon can be housed in the optical fiber cable at high density.

In addition, a sub-ribbon-type optical fiber ribbon according to an aspect of the present disclosure is (2) a sub-ribbon-type optical fiber ribbon, including: at least two sub-ribbons each including a plurality of optical fibers arranged in parallel and a first coupling portion formed by coupling the adjacent optical fibers with a resin; and intermittently second coupling portions formed by coupling parts between the adjacent sub-ribbons with the resin, in which in the second coupling portions, the resin is provided on one side surface and the other side surface of the sub-ribbon-type optical fiber ribbon, when an average of maximum values of thicknesses TF1 of the second coupling portions on the one side surface is set as $TF1_{ave}$ and an outer diameter of each optical fiber is set as D, $D/4 \leq TF1_{ave} \leq D/2$, and when an average of maximum values of thicknesses TB1 of the second coupling portions on the other side surface is set as $TB1_{ave}$, $TB1_{ave} < TF1_{ave}$. According to this configuration, when the sub-ribbons are coupled, a force is applied so as to bend to roll the optical fiber ribbon up in a cross-sectional direction during being stored in an optical fiber cable, and in this case, since resin amounts are different on both surfaces, breaking of the resin or peeling between the resin and the sub-ribbons can be less likely to occur. Therefore, a risk of the optical fiber ribbon disassembling is reduced, and the optical fiber ribbon can be easily rolled up and stored in the optical fiber cable. In addition, since the resin does not protrude from a tangent line passing through front surfaces of the optical fibers, a ribbon cross-sectional area can be prevented from becoming large, which is advantageous for densification of the optical fiber cable.

(3) The outer diameter D may be 210 μm or less. According to this configuration, the densification of the optical fiber cable can be further realized by using the optical fiber having a small diameter of 210 μm or less.

DETAILS OF EMBODIMENTS

Specific examples of the optical fiber ribbon and the sub-ribbon-type optical fiber ribbon according to the embodiments of the present disclosure will be described below with reference to the drawings. The present invention is not limited to these exemplifications, but is indicated by the scope of claims, and is intended to include all modifications within a scope and meaning equivalent to the scope of claims.

First Embodiment

Figure 2:
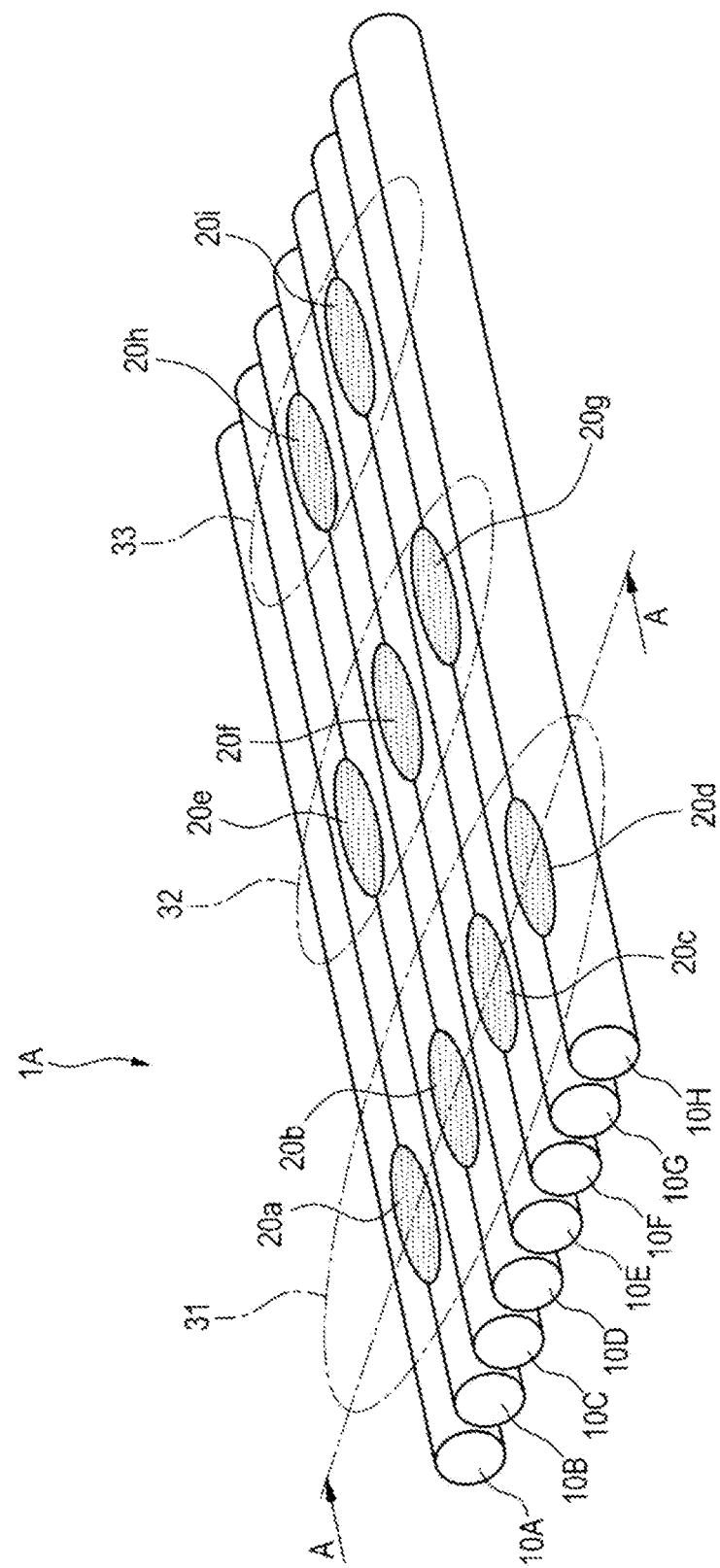
FIG. 2 is a perspective view of the optical fiber ribbon shown in FIG. 1.

FIG. 1 is a cross-sectional view of an optical fiber ribbon 1A according to a first embodiment. FIG. 2 is a perspective view of the optical fiber ribbon 1A. FIG. 1 is a cross-sectional view taken along a line A-A of FIG. 2. As shown in FIGS. 1 and 2, the optical fiber ribbon 1A includes a plurality of optical fibers 10 (10A to 10H in the present embodiment), and a plurality of coupling portions 20 (20a to 20i in the present embodiment) that couples the optical fibers 10. In the present embodiment, the eight optical fibers 10A to 10H and the nine coupling portions 20a to 20i that couple the optical fibers 10 are provided.

The eight optical fibers 10A to 10H are arranged in parallel in a direction crossing a longitudinal direction of the optical fibers. The nine coupling portions 20a to 20i are provided intermittently in the longitudinal direction and a width direction of the optical fibers 10A to 10H arranged in parallel. That is, the optical fiber ribbon 1A is an intermittently coupled-type optical fiber ribbon including the coupling portions 20a to 20i that intermittently couple parts of the optical fibers 10A to 10H in the longitudinal direction and the width direction.

The optical fiber 10 includes, for example, a glass fiber 11 including a core and a cladding, and two coating layers 12 and 13 covering the circumference of the glass fiber 11. The inner coating layer 12 of the two coating layers is made of a cured product of a primary resin. The outer coating layer 13 of the two coating layers is made of a cured product of a secondary resin. An outer diameter of the coating layer 13 made of the secondary resin, that is, an outer diameter D of each optical fiber 10 is, for example, 210 μm or less. The optical fiber 10 may have a colored layer on the outermost circumference.

In the primary resin constituting the inner coating layer 12 being in contact with the glass fiber 11, a soft resin having a relatively low Young's modulus is used as a buffer layer. In addition, in the secondary resin constituting the outer coating layer 13, a hard resin having a relatively high Young's modulus is used as a protective layer. The cured product of the secondary resin has a Young's modulus of 900 MP or higher, preferably 1000 MPa or higher, and more preferably 1500 MPa or higher at a room temperature (for example, 23° C.).

The coupling portions 20a to 20i are provided on both a front surface side (upper side in FIG. 1) and a back surface side (lower side in FIG. 1) of a ribbon surface formed by the optical fibers 10A to 10H arranged in parallel. The coupling portions 20a to 20i include front coupling portions 21a to 21i provided on the front surface side and back coupling portions 22a to 22i provided on the back surface side. The front coupling portions 21a to 21i and the back coupling portions 22a to 22i are paired and provided at the same positions on the front side and the back side between the optical fibers.

The coupling portions 20a to 20i are arranged in the width direction of the optical fiber ribbon 1A, that is, in a parallel direction of the optical fibers 10A to 10H. For example, in a splice region 31 shown in FIG. 2, the coupling portion 20a between the optical fibers 10A and 10B, the coupling portion 20b between the optical fibers 10C and 10D, the coupling portion 20c between the optical fibers 10E and 10F, and the coupling portion 20d between the optical fibers 10G and 10H are arranged in a row in the width direction. Similarly, in a splice region 32, the coupling portion 20e between the optical fibers 10B and 10C, the coupling portion 20f between the optical fibers 10D and 10E, and the coupling portion 20g between the optical fibers 10F and 10G are arranged in a row in the width direction. Similarly, in a splice region 33, the coupling portion 20h between the optical fibers 10C and 10D and the coupling portion 20i between the optical fibers 10E and 10F are arranged in a row in the width direction.

The coupling portion 20 is, for example, made of a resin material such as an acrylic ultraviolet curable resin or an epoxy ultraviolet curable resin. A Young's modulus of a cured product of the resin constituting the coupling portion 20 is 0.5 MPa or more and 200 MPa or less at the room temperature (for example, 23° C.). The coupling portion 20 may be made of a resin containing, for example, a silicone lubricant.

In this way, in the optical fiber ribbon 1A, the coupling portion 20 where the optical fibers are coupled to each other is implemented by the part coated with the resin, and a non-coupling portion where the optical fibers are not coupled to each other is implemented by a part where the resin is not applied.

The front coupling portions 21a to 21i provided on the front surface (upper surface) side of the optical fiber ribbon 1A do not protrude upward from a virtual straight line Pf passing through front surfaces of the optical fibers 10A to 10H. The back coupling portions 22a to 22i provided on the back surface (lower surface) side of the optical fiber ribbon 1A do not protrude downward from a virtual straight line Pb passing through back surfaces of the optical fibers 10A to 10H.

Specifically, the four front coupling portions 21a to 21d included in the splice region 31 are formed such that when a virtual plane H formed by connecting centers of the optical fibers 10A to 10H arranged in parallel is set as a reference position, and an average of thicknesses $TF_{max}$ from the virtual plane H to highest points of the front coupling portions 21a to 21d is set as $TF_{ave}$, $TF_{ave}$ satisfies $D/4 \leq TF_{ave} \leq D/2$ with respect to the outer diameter D of the optical fiber 10. The three front coupling portions 21e to 21g included in the splice region 32 are also formed such that an average $TF_{ave}$ of thicknesses $TF_{max}$ from the virtual plane H to highest points of the front coupling portions 21e to 21g satisfies $D/4 \leq TF_{ave} \leq D/2$. The two front coupling portions 21h and 21i included in the splice region 33 are also formed such that an average $TF_{ave}$ of thicknesses $TF_{max}$ from the virtual plane H to highest points of the front coupling portions 21h and 21i satisfies $D/4 \leq TF_{ave} \leq D/2$. In this way, for each of the splice regions 31, 32, and 33 shown in FIG. 2, the front coupling portions 21a to 21i are formed such that the average $TF_{ave}$ of the thicknesses $TF_{max}$ of the front coupling portions 21a to 21i satisfies $D/4 \leq TF_{ave} \leq D/2$.

Furthermore, the four back coupling portions 22a to 22d included in the splice region 31 are formed such that when an average of thicknesses $TB_{max}$ from the virtual plane H to lowest points of the back coupling portions 22a to 22d is set as $TB_{ave}$, $TB_{ave}$ satisfies $TB_{ave} < TF_{ave}$ with respect to the thickness average $TF_{ave}$ of the front coupling portions 21a to 21d of the splice region 31. The three back coupling portions 22e to 22g included in the splice region 32 are formed such that when an average $TB_{ave}$ of thicknesses $TB_{max}$ from the virtual plane H to lowest points of the back coupling portions 22e to 22g satisfies $TB_{ave} < TF_{ave}$ with respect to the thickness average $TF_{ave}$ of the front coupling portions 21e to 21g of the splice region 32. The two back coupling portions 22h and 22i included in the splice region 33 are formed such that when an average $TB_{ave}$ of thicknesses $TB_{max}$ from the virtual plane H to lowest points of the back coupling portions 22h and 22i satisfies $TB_{ave} < TF_{ave}$ with respect to the thickness average $TF_{ave}$ of the front coupling portions 21h and 21i of the splice region 33.

The average of the maximum values of the thicknesses TF of all the front coupling portions 21a to 21i may be calculated as $TF_{ave}$ based on the average of the maximum thicknesses of the front coupling portions for each of the splice regions 31, 32, and 33. Similarly, the average of the maximum values of the thicknesses TB of all the back coupling portions 22a to 22i may be calculated as $TB_{ave}$ based on the average of the maximum thicknesses of the back coupling portions for each of the splice regions 31, 32, and 33. It is sufficient that the average $TF_{ave}$ of the maximum values of the thicknesses TF of the front coupling portions 21a to 21i satisfies $D/4 < TF_{ave} \leq D/2$, and the individual thicknesses TF of some of the front coupling portions 21a to 21i do not have to satisfy $D/4 \leq TF \leq D/2$. Similarly, it is sufficient that the average $TB_{ave}$ of the maximum values of the thicknesses TB of the back coupling portions 22a to 22i satisfies $TB_{ave} < TF_{ave}$, and the individual thicknesses TB of some of the back coupling portions 22a to 22i do not have to satisfy $TB < TF$.

Figure 3:
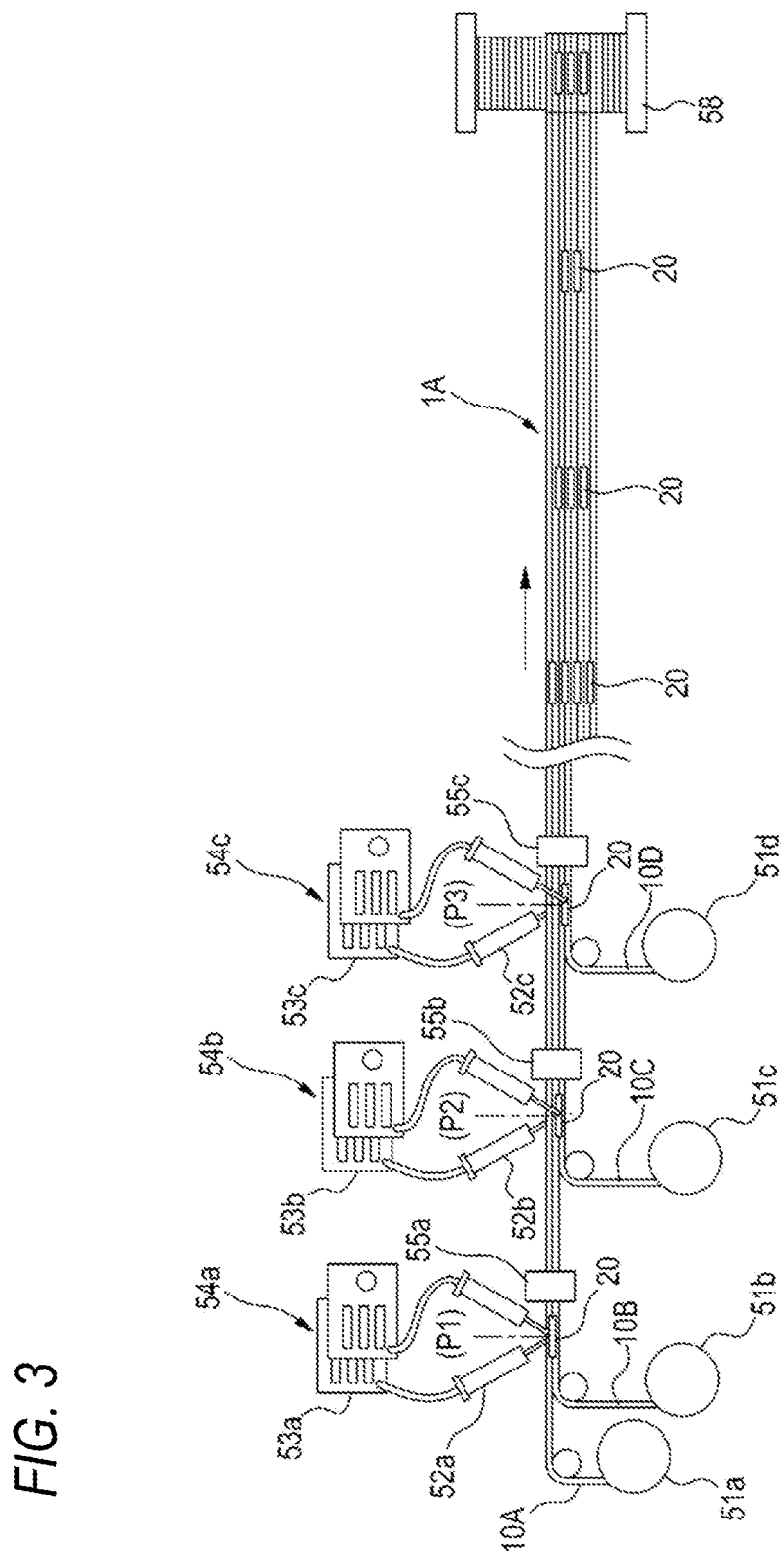
FIG. 3 is a diagram illustrating a manufacturing method of the optical fiber ribbon.

Next, a manufacturing method of the optical fiber ribbon 1A will be described with reference to FIGS. 3 to 5. As shown in FIG. 3, the optical fibers 10A to 10H are closely arranged in an up-down direction in a vertical line. The optical fibers 10A to 10H are drawn out from drawing-out bobbins at predetermined intervals such that timings for arranging the optical fibers are shifted to make the number of the optical fibers arranged in the vertical line two, three, four, . . . , and eight in order.

The optical fiber 10A drawn out from a drawing-out bobbin 51a and the optical fiber 10B drawn out from a drawing-out bobbin 51b are arranged in the up-down direction so as to be in close contact with each other at an adhesive position P1. Next, the optical fiber 10C drawn out from a drawing-out bobbin 51c is arranged in the up-down direction so as to be in close contact with the optical fiber 10B immediately above at an adhesive position P2. Next, the optical fiber 10D drawn out from a drawing-out bobbin 51d is arranged in the up-down direction so as to be in close contact with the optical fiber 10C immediately above at an adhesive position P3. Although the illustration is omitted, the optical fibers 10E to 10H are similarly arranged in the up-down direction so as to be in close contact with the adjacent optical fibers 10D to 10G immediately above at adhesive positions P4 to P7.

Adhesive means for adhering the optical fibers that are in close contact with each other in the up-down direction with the resin constituting the coupling portions 20 is provided at each of the adhesive positions P1, P2, and P3. As the adhesive means, for example, resin supply devices 54a to 54c including syringe pairs 52a to 52c that supply the resin for forming the coupling portions 20, and dispensers 53a to 53c that control a supply amount of the resin are provided. Ultraviolet irradiation devices 55a to 55c that cure the resin are provided at subsequent stages of the resin supply devices 54a to 54c.

Figure 4:
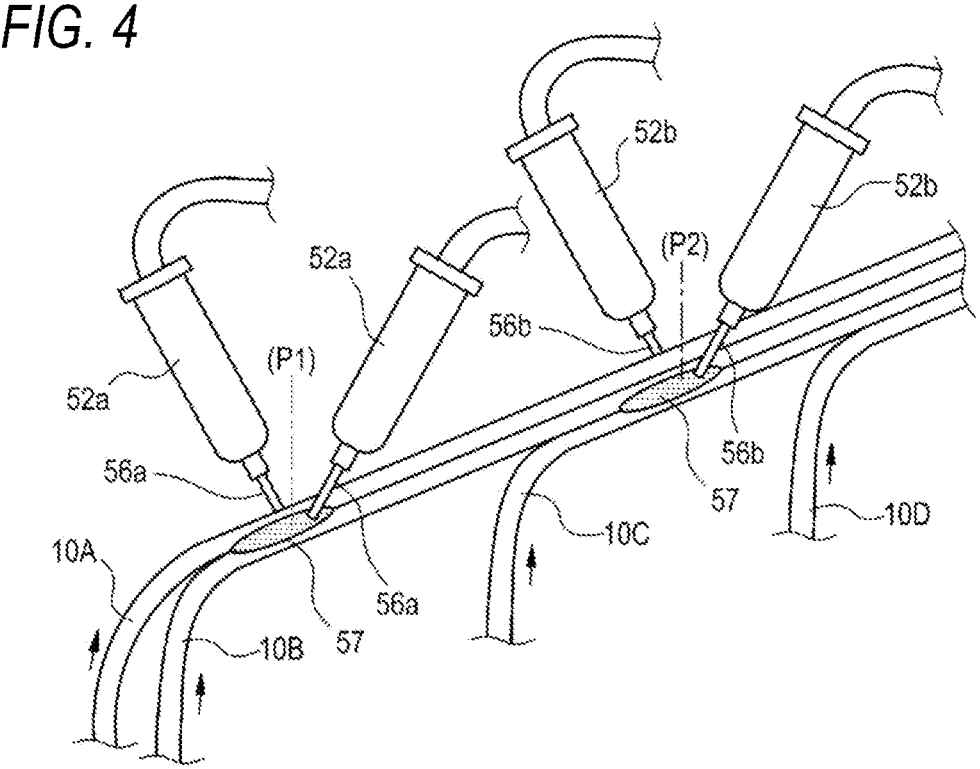
FIG. 4 is a diagram illustrating a step of applying a resin, FIG. 5 a diagram showing how the resin is applied to the optical fiber.
Figure 5:
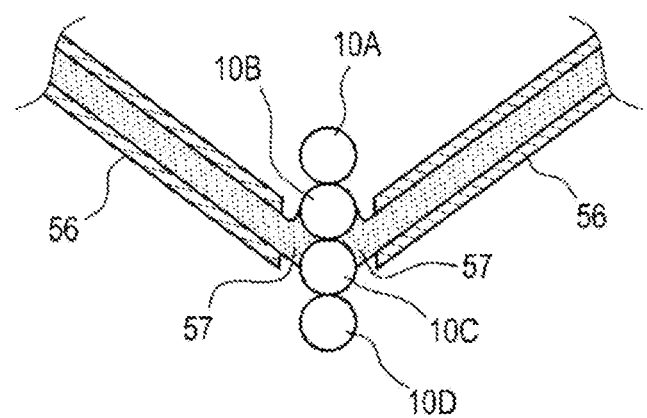

As shown in FIGS. 4 and 5, resins 57 can be applied dropwise by the syringe needle pairs 56 (56a to 56c), and it is desirable that the resins 57 adhere between the optical fibers 10 by surface tension and do not drip easily. It is preferable that the resin 57 has a viscosity of 1 PaS to 10 PaS at 25° C., for example. The syringe needle pairs 56a to 56c are arranged on both sides of the two optical fibers 10 arranged in close contact with each other in the up-down direction, and can apply the resins 57 toward the close contact portions between the two optical fibers.

The optical fiber ribbon 1A produced in this way is wound on a winding-up bobbin 58.

As described above, the optical fiber ribbon 1A is the intermittently coupled-type optical fiber ribbon including the plurality of optical fibers 10A to 10H arranged in parallel, and the intermittently coupling portions 20a to 20i formed by coupling parts between the adjacent optical fibers with the resin. In the coupling portions 20a to 20i, the resin is provided on both the front surface (example of one side surface) and the back surface (example of the other side surface) of the optical fiber ribbon 1A, when the average of the maximum values of the thicknesses TF of the front coupling portions 21a to 21i is set as $TF_{ave}$ and the outer diameter of the optical fibers 10A to 10H is set as D, $D/4 \leq TF_{ave} \leq D/2$, and when the average of the maximum values of the thicknesses TB of the back coupling portions 22a to 22i is set as $TB_{ave}$, $TB_{ave} < TF_{ave}$. According to this configuration, when the optical fiber ribbon 1A is stored in the optical fiber cable, a force is applied to bend the optical fiber ribbon 1A in a cross-sectional direction perpendicular to the longitudinal direction, and in this case, since the resin amounts (thicknesses TF and thicknesses TB) of the coupling portions 20 provided on both the front side and the back side of the optical fiber ribbon 1A are different, for example, by arranging the front coupling portions 21a to 21i, which are thicker, on the bent outside, breaking of the resin or peeling between the resin and the optical fibers can be less likely to occur. Therefore, the optical fiber ribbon 1A does not disassemble, and the optical fiber ribbon 1A can be easily rolled up, so that storability of the optical fiber ribbon 1A in the optical fiber cable can be improved. In addition, since the resin constituting both the front coupling portions 21a to 21i and the back coupling portions 22a to 22i does not protrude from a tangent line passing through the front surfaces of the optical fibers 10A to 10H, a cross-sectional area of the optical fiber ribbon 1A can be prevented from becoming large, and the optical fiber ribbon 1A can be stored in the optical fiber cable at high density.

Further, according to the optical fiber ribbon 1A, the densification of the optical fiber cable can be further realized by using the thin optical fibers 10A to 10H having the outer diameter D of 210 μm or less.

In the above embodiment, the optical fiber ribbon including the eight optical fibers is taken as an example, and the present invention is not limited thereto. For example, the optical fiber ribbon may be an optical fiber ribbon including multiples of four optical fibers, such as twelve or twenty-four optical fibers.

EMBODIMENT

Next, an embodiment of the optical fiber ribbon 1A configured as described above will be described with reference to Table 1. As shown in Table 1, various optical fiber ribbons 1A shown in No. 1 to No. 11 are produced, in which $TF_{ave}$, which is the average of the maximum thicknesses $TF_{max}$ of the front coupling portions 21a to 21i, and $TB_{ave}$, which is the average of the maximum thicknesses $TB_{max}$ of the back coupling portions 22a to 22i, are changed, and in the various optical fiber ribbons 1A shown in No. 1 to No. 11, resistance to disassembly, storability of cable, and densification during being stored in the optical fiber cable are evaluated.

TABLE 1

| | Sample number | | | | | | | | | | |
|---|---|---|---|---|---|---|---|---|---|---|---|
| | No. 1 | No. 2 | No. 3 | No. 4 | No. 5 | No. 6 | No. 7 | No. 8 | No. 9 | No. 10 | No. 11 |
| Thickness TFave (μm) of front coupling portion | 40 | 50 | 50 | 50 | 75 | 75 | 75 | 100 | 100 | 100 | 120 |
| Thickness TBave (μm) of back coupling portion | 40 | 50 | 40 | 0 | 75 | 50 | 0 | 100 | 75 | 0 | 120 |
| Resistance to disassembly | C | A | A | C | A | A | C | A | A | C | A |
| Storability of cable | B | B | A | A | B | A | A | B | A | A | B |
| Densification | A | A | A | A | A | A | A | A | A | A | C |

As shown in Table 1, in the optical fiber ribbon of No. 1, the thickness $TF_{ave}$ of the front coupling portions and the thickness $TB_{ave}$ of the back coupling portions are set to the same thicknesses of 40 μm. In the optical fiber ribbons of No. 2 to No. 4, the thicknesses $TF_{ave}$ of the front coupling portions are all set to 50 μm, and the thicknesses $TB_{ave}$ of the back coupling portions are set to 50 μm for No. 2, 40 μm for No. 3, and 0 μm for No. 4. In the optical fiber ribbons of No. 5 to No. 7, the thicknesses $TF_{ave}$ of the front coupling portions are all set to 75 μm, and the thicknesses $TB_{ave}$ of the back coupling portions are set to 75 μm for No. 5, 50 μm for No. 6, and 0 μm for No. 7. In the optical fiber ribbons of No. 8 to No. 10, the thicknesses $TF_{ave}$ of the front coupling portions are all set to 100 μm, and the thicknesses $TB_{ave}$ of the back coupling portions are set to 100 μm for No. 8, 75

μm for No. 9, and 0 μm for No. 10. In the optical fiber ribbon of No. 11, the thickness $TF_{ave}$ of the front coupling portions and the thickness $TB_{ave}$ of the back coupling portions are set to the same thicknesses of 120 μm. The outer diameter D of each of the optical fibers constituting each optical fiber ribbon is set to 200 μm. Therefore, D/4=50 μm and D/2=100 μm.

In a case where the optical fiber ribbon is spread in the width direction at the non-coupling portion where the resin is not applied, and is spread by 60% of a length of the non-coupling portion (interval between adjacent coupling portions), the "resistance to disassembly" is evaluated as "A" when the optical fibers do not peel from the coupling portion, and is evaluated as "C" when the optical fibers peel from the coupling portion. Ease of rolling the optical fiber ribbon up when the thickness $TF_{ave}$ of the front coupling portion and the thickness $TB_{ave}$ of the back coupling portion are the same is compared, and the "storability of cable" is evaluated as "A" when the optical fiber ribbon is more easily rolled up, and is evaluated as "B" when the ease of rolling the optical fiber ribbon up is the same. In terms of comparison of cross-sectional areas of the optical fiber ribbons, the "densification" is evaluated as "A" when the optical fiber ribbon with the thickness of 100 μm or less at the coupling portions is determined as an optical fiber ribbon with a small cross-sectional area and suitable for the densification, and is evaluated as "C" when the optical fiber ribbon with the thickness of more than 100 μm at the coupling portions is determined to be unsuitable for the densification.

(Evaluation Result of Resistance to Disassembly)

In the case of the optical fiber ribbon of No. 1 in which the coupling portions having the thicknesses of less than 50 um are provided on both the front surface side and the back surface side, adhesion areas between the coupling portions and the optical fibers are small, and adhesion between the coupling portions and the optical fibers is not sufficiently exhibited, and thus, the resistance to disassembly is evaluated as "C". In the case of the optical fiber ribbons of No. 4, No. 7, and No. 10 which are not provided with the back coupling portions (no resin is applied to the back surface side), adhesion between the optical fibers and the coupling portions is not sufficiently exhibited by the front coupling portions alone, and thus, the resistance to disassembly is evaluated as "C". In the case of the optical fiber ribbons of No. 2, No. 3, No. 5, No. 6, No. 8, No. 9, and No. 11 which have the thicknesses $TF_{ave}$ of 50 μm or more at the front coupling portion and the thicknesses $TB_{ave}$ of the back coupling portions of 40 μm or more, sufficient adhesion areas are secured between the coupling portions and the optical fibers, and the adhesion between the coupling portions and the optical fibers is sufficiently exhibited, and thus, the resistance to disassembly is evaluated as "A".

(Evaluation Result of Storability of Cable)

Compared to the optical fiber ribbons having the same thicknesses at the coupling portions on the front surface side and the back surface side, the optical fiber ribbons of No. 3, No. 4, No. 6, No. 7, No. 9, and No. 10 whose thicknesses $TF_{ave}$ of the front coupling portions are different from the thicknesses TB ave of the back coupling portions are easily rolled up, and thus, the storability of cable is evaluated as "A". In the case of the optical fiber ribbons of No. 1, No. 2, No. 5, No. 8, and No. 11, the thickness $TF_{ave}$ of the front coupling portions and the thickness $TB_{ave}$ of the back coupling portions are the same thicknesses, and thus, compared to the optical fiber ribbon whose thickness $TF_{ave}$ of the front coupling portions is different from the thickness $TB_{ave}$ of the back coupling portions, the optical fiber ribbons of No. 1, No. 2, No. 5, No. 8, and No. 11 are slightly difficult to be rolled up, and the storability of cable is evaluated as "B".

(Evaluation Result of Densification)

In the case of the optical fiber ribbons of No. 1 to No. 10, the thickness $TF_{ave}$ of the front coupling portions and the thickness $TB_{ave}$ of the back coupling portions are both 100 μm or less, that is, equal to or less than the outer diameter D of the optical fibers, and thus, the densification is evaluated as "A". In the case of the optical fiber ribbon of No. 11, the thickness $TF_{ave}$ of the front coupling portions and the thickness $TB_{ave}$ of the back coupling portions both exceed 100 that is, the coupling portions protrude from the front surfaces of the optical fibers, and thus, it cannot be said that the optical fiber ribbon is suitable for the densification due to the large cross-sectional area, and the densification is evaluated as "C".

From the above evaluation results, it can be confirmed that the optical fiber ribbons of No. 3, No. 6, and No. 9 are evaluated as "A" in the three evaluation items of the "resistance to disassembly", the "storability of cable", and the "densification". Then, it is confirmed that as the configurations, the coupling portions provided on the front side of the optical fiber ribbon and on the back side thereof have to satisfy the conditions of $D/4 \leq TF_{ave} \leq D/2$ and $TB_{ave} < TF_{ave}$.

SECOND EMBODIMENT

Figure 6:
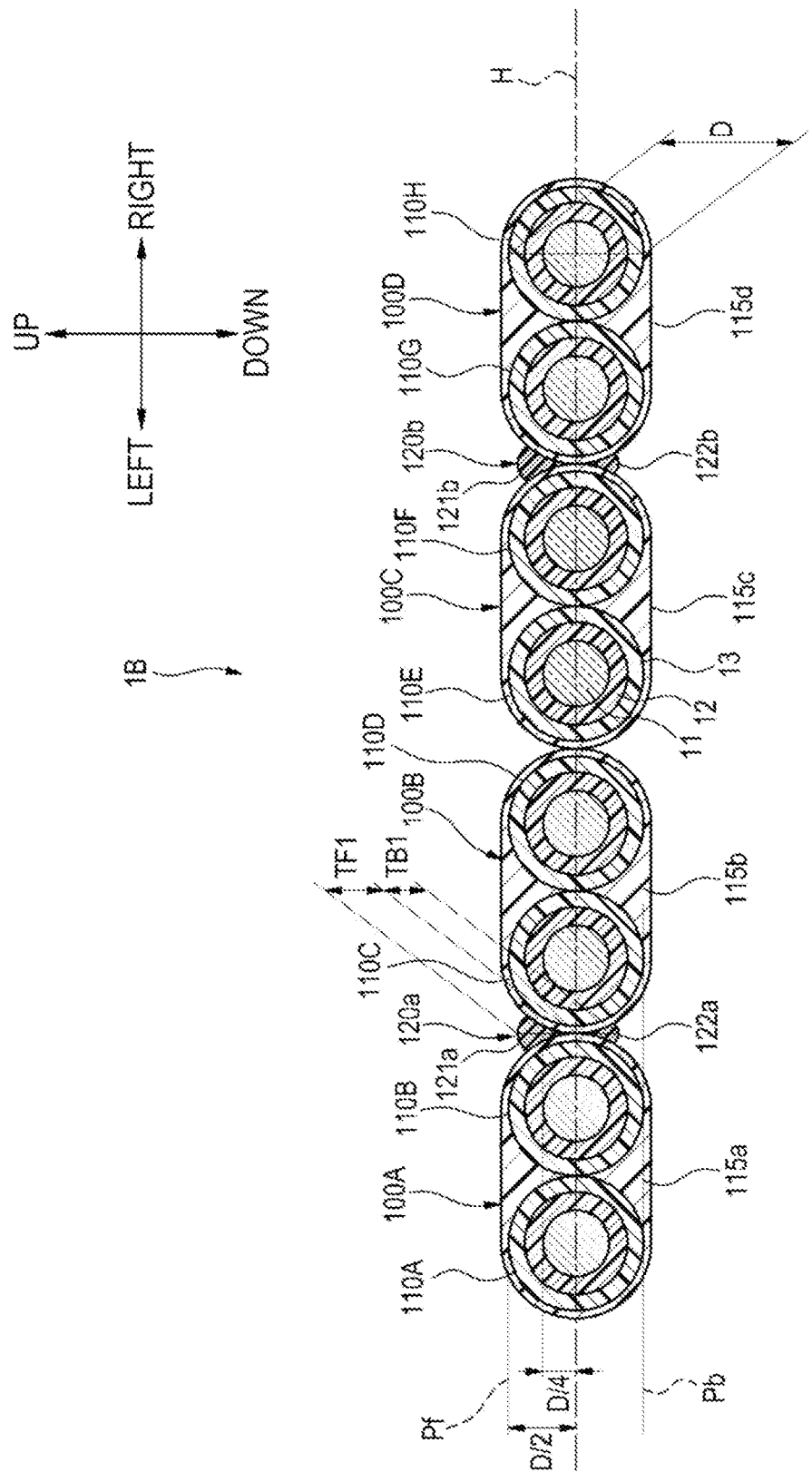
FIG. 6 is a cross-sectional view showing an optical fiber ribbon according to a second embodiment.

FIG. 6 is a cross-sectional view of an optical fiber ribbon 1B according to a second embodiment. As shown in FIG. 6, the optical fiber ribbon 1B includes a plurality (four in the present embodiment) of sub-ribbons 100 (100A to 100D in the present embodiment), and a plurality of coupling portions 120 (120a to 120b in the present embodiment) that couples the sub-ribbons 100.

Each sub-ribbon 100 includes two optical fibers 110. For example, the sub-ribbon 100A includes optical fibers 110A and 110B. Outer circumferences of the optical fibers 110A and 110B are coated with a coating resin 115a (example of the first coupling portion). The sub-ribbon 100B includes optical fibers 110C and 110D. Outer circumferences of the optical fibers 110C and 110D are coated with a coating resin 115b (example of the first coupling portion). The sub-ribbon 100C includes optical fibers 110E and 110F. Outer circumferences of the optical fibers 110E and 110F are coated with a coating resin 115c (example of the first coupling portion). The sub-ribbon 100D includes optical fibers 110G and 110H. Outer circumferences of the optical fibers 110G and 110H are coated with a coating resin 115d (example of the first coupling portion). An outer diameter D of each of the optical fibers 110A to 110H is, for example, 210 μm or less.

The coupling portion 120a (example of the second coupling portion) is provided between the sub-ribbons 100A and 100B. The coupling portion 120b (example of the second coupling portion) is provided between the sub-ribbons 100C and 100D. The coupling portion 120a and the coupling portion 120b are arranged in parallel in a width direction of the optical fiber ribbon 1B. The coupling portions 120a and 120b include front coupling portions 121a and 121b provided on a front surface side of the optical fiber ribbon 1B and back coupling portions 122a and 122b provided on a back surface side. The front coupling portions 121a and 121b and the back coupling portions 122a and 122b are paired and provided at the same positions on the front side and the back side between the optical fibers.

In the cross-sectional view shown in FIG. 6, the two coupling portions 120a and 120b are shown, and the coupling portions 120 in the optical fiber ribbon 1B are, for example, similarly to those in the optical fiber ribbon 1A shown in FIG. 2, intermittently provided in a longitudinal direction and the width direction of the sub-ribbons 100A to 100D arranged in parallel. The optical fiber ribbon 1B is an intermittently coupled-type and sub-ribbon-type optical fiber ribbon including the coupling portions 120 that couples parts of the sub-ribbons in the longitudinal direction and the width direction of the sub-ribbons 100A to 100D.

The front coupling portions 121a and 121b of the optical fiber ribbon 1B do not protrude upward from a straight line Pf passing through front surfaces (upper surfaces in FIG. 6) of the optical fibers 110A to 110H. The back coupling portions 122a and 122b of the optical fiber ribbon 1B do not protrude downward from a straight line Pb passing through back surfaces (lower surfaces in FIG. 6) of the optical fibers 110A to 110H.

For example, when a virtual plane H formed by connecting centers of the optical fibers 110A to 110H arranged in parallel is set as a reference position, and an average of thicknesses $TF1_{max}$ from the virtual plane H to highest points of the front coupling portions 121a and 121b is set as $TF1_{ave}$, $TF1_{ave}$ satisfies $D/4 \leq TF1_{ave} \leq D/2$ with respect to the outer diameter D of the optical fiber 110. In addition, when an average of thicknesses $TB1_{max}$ from the virtual plane H to lowest points of the back coupling portions 122a and 122b is set as $TB1_{ave}$, $TB1_{ave}$ satisfies $TB1_{ave} < TF1_{ave}$ with respect to $TF1_{ave}$. The average $TF1_{ave}$ and the average $TB1_{ave}$ may be averages for each splice region arranged in parallel in the width direction of the optical fiber ribbon 1B, as in the case of the first embodiment.

As described above, the optical fiber ribbon 1B according to the second embodiment is the sub-ribbon-type optical fiber ribbon including the sub-ribbons 100A to 100D including the plurality of optical fibers 110A to 110H arranged in parallel, and the coating resins 115a to 115d (examples of the first coupling portions) formed by coupling the adjacent optical fibers with the resin. The optical fiber ribbon 1B intermittently includes the coupling portions 120a and 120b (examples of the second coupling portions) formed by coupling parts between the adjacent sub-ribbons with the resin, and in the coupling portions 120a and 120b, the resin is provided on both the front surface (example of one surface) side and the back surface (example of the other surface) side of the optical fiber ribbon 1B. Then, when the average of the maximum values of the thicknesses TF1 of the front coupling portions 121a and 121b is set as $TF1_{ave}$, and the outer diameter of each of the optical fibers 110A to 110H is set as D, $D/4 \leq TF1_{ave} \leq D/2$, and when the average of the maximum values of the thicknesses TB1 of the back coupling portions 122a and 122b is set as $TB1_{ave}$, $TB1_{ave} < TF1_{ave}$. By configuring the sub-ribbon-type optical fiber ribbon formed by coupling the sub-ribbons in this way, the same effects as in the case of the optical fiber ribbon 1A of the first embodiment can be obtained.

In the above second embodiment, the sub-ribbon including the two optical fibers is taken as an example, and the number of optical fibers constituting the sub-ribbon may be a predetermined number of two or more. The sub-ribbon may be an intermittently-coupled sub-ribbon intermittently having coupling portions and non-coupling portions in the longitudinal direction or width direction of the optical fibers.

Although the present disclosure has been described in detail and with reference to the specific embodiments, it will be apparent to those skilled in the art that various changes and modifications can be made without departing from the spirit and scope of the present disclosure. In addition, the number, positions, shapes, and the like of the constituent members described above are not limited to those in the above embodiment, and can be changed to suitable numbers, positions, shapes, and the like in carrying out the present disclosure.

REFERENCE SIGNS LIST 1A, 1B: optical fiber ribbon
10 (10A to 10H): optical fiber
11: glass fiber
12: coating layer (primary resin)
13: coating layer (secondary resin)
20 (20a to 20i): coupling portion
21a to 21i: front coupling portion
22a to 22i: back coupling portion
31 to 33: splice region
51a to 51d: bobbin
52a to 52c: syringe pair
53a to 53c: dispenser
54a to 54c: resin supply device
55a to 55c: ultraviolet irradiation device
56 (56a, 56b): syringe needle pair
57: resin
58: winding-up bobbin
100 (100A to 100D): sub-ribbon
110 (110A to 110H): optical fiber
115a to 115d: coating resin (example of first coupling portion)
120 (120a, 120b): coupling portion (example of second coupling portion)
121a, 121b: front coupling portion
122a, 122b: back coupling portion
D: outer diameter of optical fiber
TF, TB: thickness of coupling portion
H: virtual plane
P1 to P3: adhesive position
Pf, Pb: virtual straight line

The invention claimed is:

1. An intermittently coupled-type optical fiber ribbon, comprising:
   a plurality of optical fibers arranged in parallel; and
   intermittently coupling portions formed by coupling parts between the adjacent optical fibers with a resin, wherein
   in the coupling portions, the resin is provided on one side surface and the other side surface of the optical fiber ribbon,
   when an average of maximum values of thicknesses TF of the coupling portions on the one side surface is set as $TF_{ave}$ and an outer diameter of each optical fiber is set as D, $D/4 \leq TF_{ave} \leq D/2$, and
   when an average of maximum values of thicknesses TB of the coupling portions on the other side surface is set as $TB_{ave}$, $TB_{ave} < TF_{ave}$, wherein
   $(2/3) \times TF_{ave} \leq TB_{ave}$.

2. The optical fiber ribbon according to claim 1, wherein the outer diameter D is 210 µm or less.

3. The optical fiber ribbon according to claim 1, further comprising:
   non-coupling portions where the optical fibers are not coupled to each other and no resin is applied to the optical fibers.

4. A sub-ribbon-type optical fiber ribbon, comprising:
at least two sub-ribbons each including a plurality of optical fibers arranged in parallel and a first coupling portion formed by coupling the adjacent optical fibers with a resin; and
intermittently second coupling portions formed by coupling parts between the adjacent sub-ribbons with the resin, wherein
in the second coupling portions, the resin is provided on one side surface and the other side surface of the sub-ribbon-type optical fiber ribbon,
when an average of maximum values of thicknesses TF1 of the second coupling portions on the one side surface is set as $TF1_{ave}$ and an outer diameter of each optical fiber is set as D, $D/4 \leq TF1_{ave} \leq D/2$, and
when an average of maximum values of thicknesses TB1 of the second coupling portions on the other side surface is set as $TB1_{ave}$, $TB1_{ave} < TF1_{ave}$, wherein $(2/3) \lambda TF1_{ave} \leq TB1_{ave}$.

5. The sub-ribbon-type optical fiber ribbon according to claim 4, wherein
the outer diameter D is 210 μm or less.

6. The sub-ribbon-type optical fiber ribbon according to claim 4, wherein
a thickness of each of the sub-ribbons at the first coupling portion is greater than the outer diameter D of each optical fiber.

* * * * *